US009080437B2

United States Patent
Brunner et al.

(10) Patent No.: US 9,080,437 B2
(45) Date of Patent: Jul. 14, 2015

(54) ADJUSTABLE LOCKING SHAFT-LOCATING DEVICE

(71) Applicant: Baker Hughes Incorporated, Houston, TX (US)

(72) Inventors: Christopher M. Brunner, Owasso, OK (US); Jason Ives, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 373 days.

(21) Appl. No.: 13/621,988

(22) Filed: Sep. 18, 2012

(65) Prior Publication Data

US 2014/0079574 A1    Mar. 20, 2014

(51) Int. Cl.
| | | |
|---|---|---|
| *E21B 43/00* | (2006.01) | |
| *E21B 43/12* | (2006.01) | |
| *F04B 17/03* | (2006.01) | |
| *F04B 53/00* | (2006.01) | |
| *F04B 47/06* | (2006.01) | |
| *F16D 1/08* | (2006.01) | |
| *F16D 1/096* | (2006.01) | |
| *F04D 13/10* | (2006.01) | |

(52) U.S. Cl.
CPC .............. *E21B 43/128* (2013.01); *F04B 17/03* (2013.01); *F04B 47/06* (2013.01); *F04B 53/00* (2013.01); *F16D 1/08* (2013.01); *F16D 1/096* (2013.01); *F04D 13/10* (2013.01); *Y10T 29/49948* (2015.01); *Y10T 279/17504* (2015.01)

(58) Field of Classification Search
CPC ......... F04B 47/06; F04B 13/10; E21B 43/128
USPC ......... 417/424.1, 424.2; 403/367, 371, 374.1; 166/105
See application file for complete search history.

(56) References Cited

U.S. PATENT DOCUMENTS

| | | | | |
|---|---|---|---|---|
| 2,377,046 | A | * | 5/1945 | Siegerist ...................... 403/356 |
| 4,260,182 | A | | 4/1981 | Bruner |
| 5,174,680 | A | * | 12/1992 | Nakamura et al. ............ 403/370 |
| 5,209,577 | A | * | 5/1993 | Swatek ........................... 384/97 |
| 5,217,261 | A | | 6/1993 | DeWitt |
| 5,695,297 | A | * | 12/1997 | Geib ............................. 403/371 |
| 6,039,361 | A | | 3/2000 | Meli |
| 6,050,788 | A | * | 4/2000 | McEwen et al. .......... 417/423.11 |
| 6,416,225 | B1 | * | 7/2002 | Cioceanu et al. ............... 384/97 |
| 6,487,882 | B2 | * | 12/2002 | Trempala ........................ 70/169 |
| 6,883,604 | B2 | | 4/2005 | Mack |
| 7,316,777 | B2 | | 1/2008 | Loy, Jr. |
| 7,488,137 | B2 | * | 2/2009 | Hu et al. ..................... 403/374.4 |
| 7,549,837 | B2 | | 6/2009 | Hackworth |
| 7,701,106 | B2 | | 4/2010 | Yuratich |

(Continued)

FOREIGN PATENT DOCUMENTS

GB         1364265    *  8/1974

*Primary Examiner* — Charles Freay
(74) *Attorney, Agent, or Firm* — Bracewell & Giuliani LLP

(57) ABSTRACT

A shaft-locating device can include a cylindrical inner collet having an engaging surface on an inner diameter and an outward-facing tapered portion on an outer surface and an outer nut, concentrically located around the inner collet. The outer nut can have an inward-facing tapered portion that engages the outward-facing tapered portion of the inner collet, causing the inner diameter of the inner collet to become smaller, thus engaging, for example, a shaft around which the inner collet is located. In embodiments, a shoulder on the inner collet can prevent axial movement of a shaft-mounted component such as, for example, a bearing.

17 Claims, 3 Drawing Sheets

(56) References Cited

U.S. PATENT DOCUMENTS

| | | |
|---|---|---|
| 7,909,090 B2 | 3/2011 | Reid |
| 7,971,650 B2 | 7/2011 | Yuratich |
| 2004/0144570 A1* | 7/2004 | Spring .......................... 175/104 |
| 2005/0220534 A1* | 10/2005 | Ober ............................ 403/370 |
| 2007/0051510 A1* | 3/2007 | Veneruso et al. .......... 166/244.1 |

* cited by examiner

ADJUSTABLE LOCKING SHAFT-LOCATING DEVICE

BACKGROUND

1. Field of Invention

The present disclosure relates in general to an apparatus and method for axially locating and locking in place components on a shaft. More specifically, the invention relates to a shaft-locating device that grips an outer diameter surface of a shaft.

2. Description of Prior Art

Electrical submersible pumps ("ESP") are used to pump wellbore fluids from the depths of the earth to the surface. A typical ESP can include a motor, a seal section, and a pump. The motor rotates a shaft that passes through the seal section to the pump. The shaft carries rotational energy to the pump, which creates a pressure differential that draws in wellbore fluid and propels that fluid to the surface. Various components must be fixed to the shaft so that they do not move axially, relative to the shaft, while the shaft is rotating. For example, bearing assemblies can be positioned on the shaft to constrain the shaft while it is rotating.

The bearing assemblies constraining the shaft must be locked into a specified axial position. Currently, axially locking a bearing assembly requires the use of, for example, snap rings, spacer sleeves, compression nuts, or a combinations thereof. Regardless of the components chosen, either the shaft or the components must be machined, manufactured, and assembled. Snap rings require a radial groove to be machined into the shaft. The grove reduces the outer diameter of the shaft and therefore reduces the strength of the shaft. Compression nuts require the shaft to be threaded, which also can reduce the outer diameter of the shaft or make the manufacture of the shaft more expensive. If the groove or threads are not precisely located, spacer sleeves must be used to locate the bearing assembly in its preferred axial position. Spacer sleeves can also be used to position a component on a shaft by maintaining the component a specified distance from another component on the shaft. All of these techniques for fixing components to a shaft increase the complexity of manufacture and assembly, increase the cost to manufacture, and in some cases weaken the shaft. It is desirable to fix components to the shaft without machining grooves or threads into the shaft or using spacer sleeves along the shaft.

SUMMARY OF THE INVENTION

Embodiments of a locking shaft-locating device can be used, for example, in an electrical submersible pump ("ESP"). The ESP can include a pump section, a seal section, and a motor section. A shaft can run from the motor, through the seal section, and into the pump section. The shaft can transfer rotational force from the motor to the pump. The shaft's position within the ESP can be constrained by bearing assemblies. The axial location of these bearing assemblies must be maintained for proper functioning of the ESP. In embodiments, the shaft-locating device can lock to the shaft of the ESP and is capable of securing the axial position of other ESP components including, for example, bearing assemblies. The shaft-locating device can be installed with a single tool at any location along the shaft.

BRIEF DESCRIPTION OF DRAWINGS

Some of the features and benefits of the present invention having been stated, others will become apparent as the description proceeds when taken in conjunction with the accompanying drawings, in which.

Figure 1:
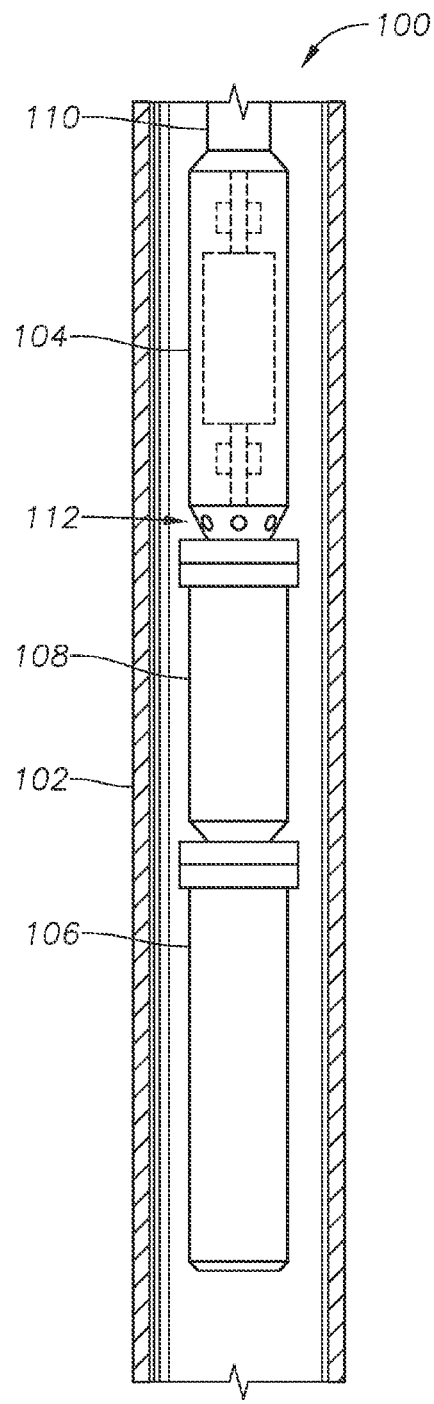
FIG. 1 is an environmental side view of an electrical submersible pump ("ESP") assembly constructed in accordance with an embodiment of the invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, electrical submersible pump ("ESP") 100 is located in wellbore 102. ESP 100 can include pump assembly 104, motor 106, and seal section 108. ESP 100 may be suspended from tubing 110 in wellbore 102, wherein it is submerged in wellbore fluid. Wellbore fluid is drawn into pump inlet 112 on pump 104 and then pumped up to the surface through tubing 110. Motor 106 may be any type of motor including, for example, an electric motor. Motor 106 powers pump 104 via shaft 114 (FIG. 2), which runs through seal section 108.

Figure 2:
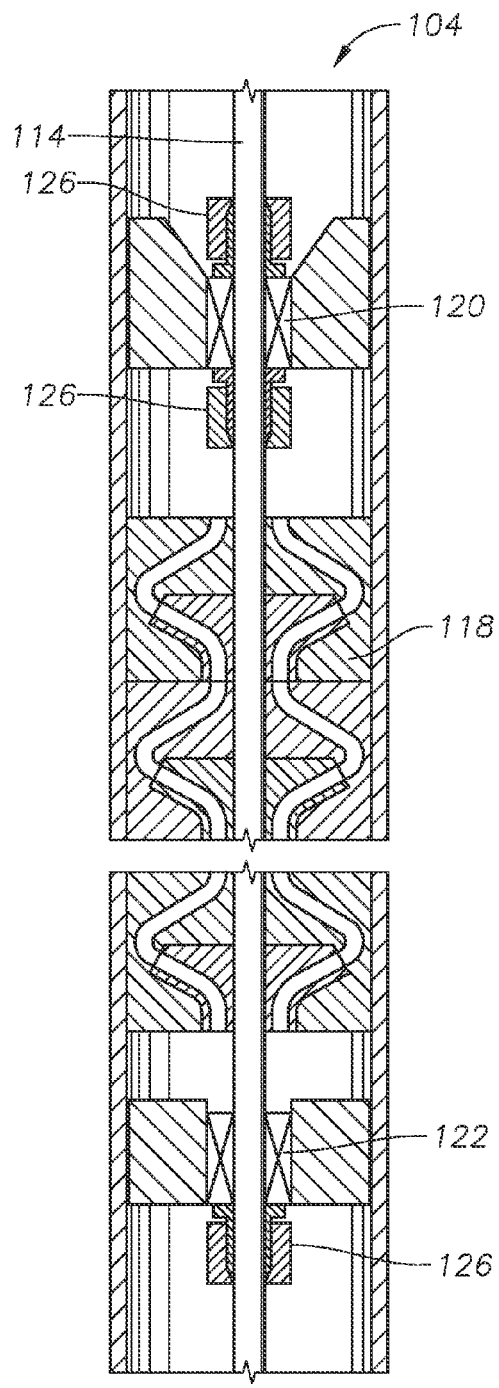
FIG. 2 is a side sectional view of the pump section of the ESP of FIG. 1.

Referring to FIG. 2, shaft 114 rotates impeller-diffusor stack 118. In embodiments, the shaft may be concentrically constrained within the ESP assembly above the impeller-diffusor stack 118 by top bearing assembly 120 and below impeller-diffusor stack 118 by bottom bearing assembly 122. The bearing assemblies may be axially constrained along the shaft by shaft-locating devices 176.

Figure 3:
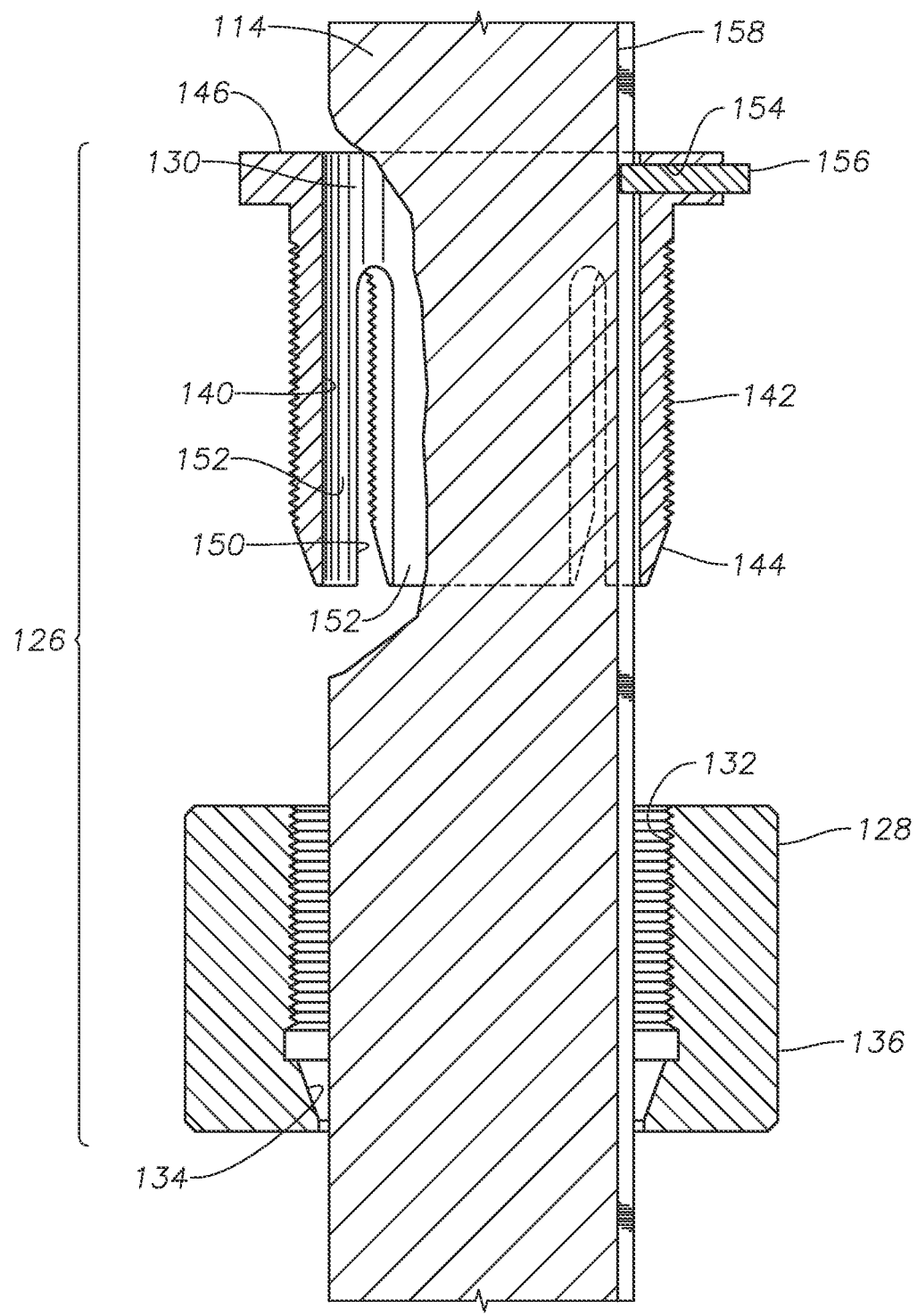
FIG. 3 is an enlarged cross-sectional front view of the shaft-locating device of FIG. 1 showing the components of the shaft-locating on the shaft, prior to being threadingly engaged.
Figure 4:
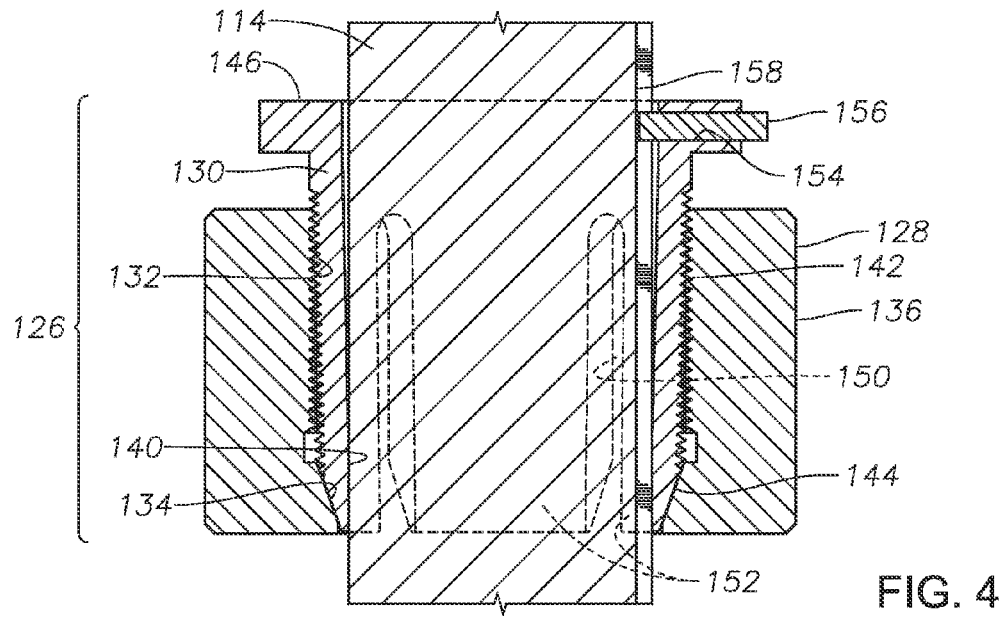
FIG. 4 is an enlarged cross-sectional front view of the shaft-locating device of FIG. 1 showing the components of the shaft-locating on the shaft, in an energized state.

Referring to FIGS. 3 and 4, shaft-locating device 126 can include outer nut 128 and cylindrical inner collet 130. Outer nut 128 and inner collet 130 may be constructed of metal, plastic, composite, or any other suitably rigid material. The components of shaft locating device 126 can be corrosion resistant. Outer nut 128 may be a cylindrical member with threads 132 on an inner diameter surface. Outer nut 128 can also have a tapered portion 134 on the inner diameter surface. In embodiments, the inner diameter of the taper portion becomes smaller while moving axially away from the threads 132. The inner diameter of at least a portion of the tapered portion 134 can be smaller than the inner diameter of the threads 132. Alternatively, threads 132 can taper inward, such that the inner diameter of threaded portion becomes smaller, at a rate greater than the standard taper rate of threaded connections.

Outer surface 136 of outer nut 128 can have a shape to facilitate using a tool to rotate outer nut 128. Outer surface 136 can have, for example, a hexagonal shape (best shown in FIG. 5) suitable for engaging with a wrench, such as an open ended wrench. Alternatively, outer surface 136 can have slots or recesses (not shown) for engaging a spanner wrench. In embodiments, outer surface 136 can be cylindrical and be engaged by, for example, a pipe wrench.

Inner collet 130 has an inner surface 140 and an outer surface. The outer surface can include a threaded portion 142 and a tapered portion 144. Threads 132 of outer nut 128 can threadingly engage threaded portion 142 of inner collet 130. Tapered portion 144 can be a tapered surface on the outer surface of inner collet 130. In embodiments, the outer diameter of tapered portion 144 can become smaller when moving axially away from threaded portion 142. In embodiments, all or a portion of the threaded portion 142 can have a taper, the taper being greater than or equal to the taper of conventional threads, and thus threaded portion 142 and tapered portion 144 can overlap. Regardless of the position of tapered portion 134 and tapered portion 144, each tapered portion 134, 144 has a generally conical shape and, when placed concentrically together, the conical shapes overlap. As tapered portion 134 is axially advanced along tapered portion 144, the cone shaped pieces create a swage to urge tapered portion 144 inward in response to force from tapered portion 134.

The inner diameter of inner collet 130, in its relaxed state, can be slightly greater than the outer diameter of shaft 114. In embodiments, inner surface 140 can have a smooth finish. In embodiments, inner surface 140 can be a textured surface (not shown). In embodiments, inner collet 130 may also have a shoulder 146, which can be a substantially flat shoulder or a profiled shoulder. Shoulder 146 can be used to axially secure ESP components including, for example, a bearing assembly such as top bearing assembly 120.

In embodiments, inner collet 130 can have a plurality of axial slots 150. Axial slots 150 can extend, axially, from an end of inner collet 130 to a point along the sidewall of inner collet 130. The arc-shaped segments of inner collet 130 located between each pair of axial slots 150 is defined as a finger 152. At least a portion of axial slots 150 can be axially aligned with at least a portion of tapered surface 134. In embodiments, axial slots can extend from the end opposite of shoulder 146 to a point along the sidewall of inner collet 130. Axial slots 150 can extend a distance greater than half the axial length of inner collet 130. Axial slots 150 can enable fingers 152 to flex inward in response to inward radial force on, for example, tapered surface 134. Longer axial slots 150 can provide greater flexibility. The materials used to manufacture outer nut 128 and inner collet 130 can be selected so that fingers 152 can flex inward without permanent deformation so that shaft-locking device 126 can be removed and reused.

In embodiments, threaded portion 132 of outer nut 128 engages threaded portion 142 of inner collet 130. As outer nut 128 is tightened around inner collet 130, tapered portion 134 of outer nut 128 contacts tapered portion 144 of inner collet 130. Further tightening causes tapered portion 134 to exert increasing force upon tapered portion 144, thereby urging the less rigid tapered portion 144 radially inward. When shaft-locating device 126 is mounted on shaft 114 for this process, inner surface 140 of inner collet 130 contacts shall 114 and friction between the two surfaces locks shaft-locating device 126 in the given axial position. Shaft locking device 126 can be positioned at any desired axial position along shaft 114 as long as there is a sufficiently sized outer diameter portion of shaft 114 at that position, with which inner surface 140 can interact. The threads of threaded portion 132 and threaded portion 142 can be oriented such that rotation of shaft 114 in a direction anticipated during operation of the pump further tightens or engages outer nut 128 onto inner collet 130. In embodiments, threads having a direction referred to as "left hand threads" can be used so that rotation of shaft 114 urges outer nut 128 further onto inner collet 130, thus tightening the engagement between inner surface 140 and shaft 114.

In other embodiments, the function performed by the threaded portions (132 & 142) may be replaced by other techniques of securing outer nut 128 to inner collet 130. For example, a plurality of set screws (not shown) extending through outer nut 128 and at least partially into inner collet 130 may be used to maintain compressive contact between tapered portion 134 and tapered portion 144. In still other embodiments, a clamping mechanism (not shown) may be used for the same purpose.

Figure 5:
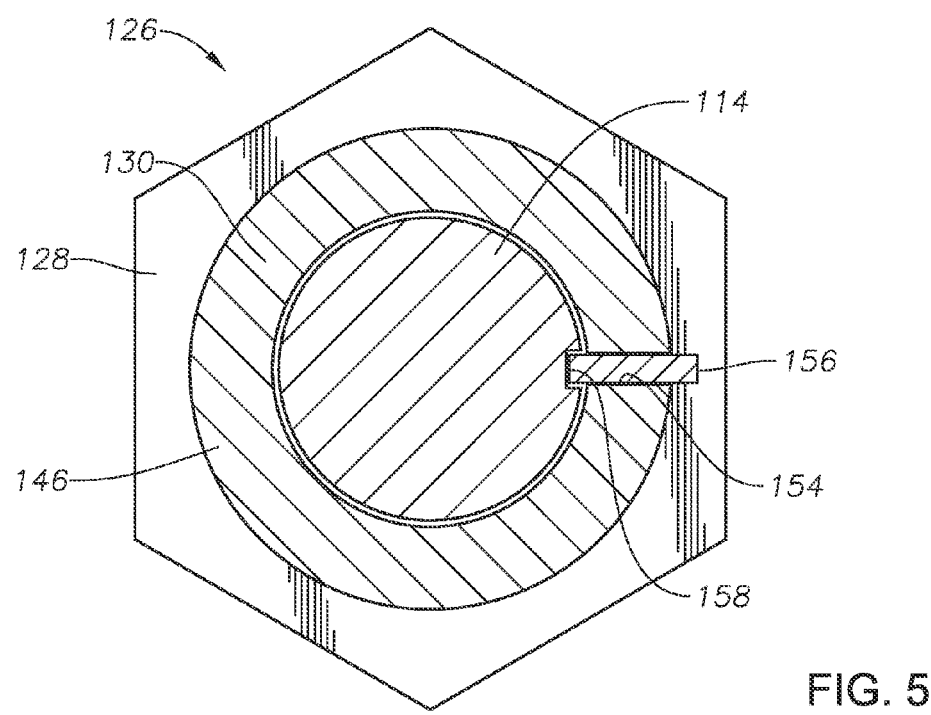
FIG. 5 is a top view of the shaft-locating device of FIG. 1.

As best shown in FIG. 5, inner collet 130 may have a radially extending aperture 154 for alignment pin 156. Alignment pin 156 can be secured in aperture 154 by a variety of techniques including, for example, press-fitting, threadingly engaging, and welding. Alignment pin 156 may be engaged with alignment groove 158 in shaft 114 to restrict the radial freedom of inner collet 130. Such restriction can prevent inner collet 130 from rotating, relative to shaft 114. When alignment pin 156 engages alignment groove 158, and shaft 114 is sufficiently restricted from rotation, outer nut 128 can be tightened around inner collet 130 using only a single tool, such as a wrench. Furthermore, alignment pin 156 can slidingly engage alignment groove 158 so that inner collet 130 can be positioned on shaft 114 after alignment pin 156 is inserted through aperture 154.

In operation, inner collet 130 is positioned on shaft 114. Shaft 114 can be a shaft in an ESP, or can be a shaft in another type of device. Alignment pin 156 engages groove 158 to prevent inner collet 130 from rotating relative to shaft 114. Alignment pin can be installed in aperture 154 before positioning inner collet 130 on shaft 114, in which case collet 130 can slide along shaft 114 with alignment pin 156 along groove 158, or alignment pin 156 can be inserted into aperture 154 and groove 158 after inner collet 130 is on shaft 114. Inner collet 130 can slide along shaft 114 until it an end surface of collet 130, such as shoulder 146, contacts and adjacent component such as bearing assembly 120 or 122. Inner collet 130, and thus shaft locating device 126, can be positioned at any point along shaft 114. In embodiments, there is an absence of grooves or threads at the location or proximate to the point where shaft locating device 126 is positioned. In embodiments, there is an absence of spacer sleeves adjacent to shaft components such as bearing assemblies 120 or 122.

Outer nut 128 can be positioned on collet 130 before or after collet 130 is positioned in contact with an adjacent component, provided that nut 128 is not tightened until collet 130 is in proper position. With shoulder 146 in contact with, for example, bearing assembly 120, outer nut can be tightened onto inner collet 130. Outer nut 128 is then moved axially, relative to collet 130, from a first, or non-energized, position to a second, or energized, position. Outer nut 128 can be rotated relative to collet 130, with threads 132 engaging threaded portion 142, to cause outer nut to move axially relative to collet 130. As outer nut 128 advances to the second, energized position, tapered portion 134 engages tapered portion 144 of inner collet 130. This engagement urges inward inner surface 140 of inner collet 130, such that inner surface 140 engages the outer diameter surface of shaft 114. Friction between inner surface 140 and shaft 114 prevents inner collet 130 from moving relative to shaft 114. A rotational lock can be used to prevent outer nut 128 from moving from the second position back toward the first position. For example, set screw 160 can be inserted through aperture 162 and engage inner collet 130, thus preventing nut 128 from moving axially or rotationally relative to collet 130.

With inner collet 130 fixed in position by friction against shaft 114, shoulder 146 prevents the adjacent component, such as bearing 120 or 122, from axially moving in the direction of shaft locating device 126. With a shaft locating device 126 installed on either side of the component, the component cannot move axially along shaft 114. In embodiments, shaft 114, nut 128, and collet 130 are not permanently deformed when nut 128 moves from the first to the second position and collet 130 engages shaft 114. Because the components are not permanently deformed, shaft locating device 126 can be removed and reused.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. An electrical submersible pump assembly, comprising:
a pump having a housing, a longitudinal axis and a plurality of pump stages, each of the stages having an impeller and a diffuser;
a shaft extending through the housing along the axis, the impellers being carried on the shaft for rotation therewith;
an axial alignment groove formed in an outer surface of the shaft;
upper and lower radial support bearings in the housing above and below the pump stages, respectively, through which the shaft extends;
a motor operably coupled with the shaft for rotating the shaft;
a plurality of shaft-locating devices one of the shaft-locating devices being located above and in abutment with an upper side of one of the support bearings, and another of the shaft-locating devices being located below and in abutment with a lower side of one of the support bearings for restricting axial movement of the shaft in the housing relative to the support bearings, each of the shaft-locating devices comprising:
a cylindrical inner collet having an engaging surface on an inner diameter through which the shaft extends and an outward-facing tapered portion on an outer surface;
an outer nut, concentrically located around the inner collet, the outer nut having an inward-facing tapered portion on an inner surface, at least a portion of the inward-facing tapered portion having an inner diameter that is smaller than at least a portion of an outer diameter of the outward-facing tapered portion; and wherein when the outer nut is axially moved from a first position to a second position relative to the inner collet, the inward-facing tapered portion of the outer nut urges the outward-facing tapered portion inward, so that the engaging surface moves radially inward toward an axis of the inner collet, frictionally gripping the shaft to prevent axial movement of the shaft locating device relative to the shaft.

2. The assembly according to claim 1, wherein:
the inner surface of the outer nut has a threaded portion that engages a threaded portion of the outer surface of the inner collet; and
the outer nut has drive surfaces on an exterior for engagement by a tool to rotate the outer nut relative to the inner collet and move the outer nut from the first position to the second position.

3. The assembly according to claim 1, further comprising:
a shaft having an axial alignment groove on an outer surface of the shaft;
a radially extending orifice in the inner collet and extending from the outer surface of the inner collet to the inner diameter of the inner collet; and
an alignment pin positioned within the orifice; a portion of the alignment pin engaging the alignment groove to prevent rotation of the inner collet relative to the shaft.

4. The assembly according to claim 1, wherein the inner surface of the outer nut has a threaded portion that engages a threaded portion of the outer surface of the inner collet.

5. The assembly according to claim 1, wherein:
a shoulder portion of the inner collet extends axially past the outer nut; and
the shoulder portion is in abutment with one of the support bearings.

6. The assembly according to claim 1, further comprising:
an axial alignment groove on an outer surface of the shaft;
a shoulder portion of the inner collet that extends axially past the outer nut;
a radially extending orifice in the shoulder portion of inner collet; and
an alignment pin positioned within the orifice, a portion of the alignment pin engaging the alignment groove to prevent rotation of the inner collet relative to the shaft.

7. The assembly according to claim 1, wherein an end of the inner collet comprises a radially extending shoulder, the shoulder being in abutment with one of the support bearings.

8. The assembly according to claim 1, wherein the inner collet further comprises a plurality of axial slots, the axial slots being spaced apart around the circumference of the inner collet.

9. The assembly according to claim 1, wherein the outer nut and the inner collet are not permanently deformed when the outer nut is advanced from the first position to the second position.

10. An electrical submersible pump assembly comprising:
a plurality of modules secured together, one of the modules comprising a motor and another of the modules comprising a pump that is driven by the motor;
at least one of the modules comprising:
a housing with a longitudinal axis;
a rotatably driven shaft axially located in the housing;
upper and lower support bearings in the housing that radially support the shaft;
an upper shaft-locating device, rigidly mounted on the shaft and located adjacent to an upper side of one of the support bearings, preventing downward movement of the shaft in the housing;

a lower shaft-locating device, rigidly mounted on the shaft and located adjacent to a lower side of one of the support bearings, preventing upward movement of the shaft in the housing; each of the shaft-locating devices comprising:
- a cylindrical inner collet, concentrically positioned on the shaft, having
  - an engaging surface on an inner diameter,
  - an outward-tapered portion on an outer surface,
  - a radially extending, substantially flat shoulder on an end of the inner collet, the shoulder being in contact with one of the sides of one of the support bearings;
  - a plurality of axial slots;
- an outer nut, concentrically located around the inner collet, the outer nut having an inward facing tapered portion on an inner surface, at least a portion of the inward-facing tapered portion having an inner diameter that is smaller than at least a portion of an outer diameter of the outward-facing tapered portion; and wherein
- when the outer nut is axially moved from a first position to a second position relative to the inner collet, the inward-facing tapered portion of the outer nut urges the outward-facing tapered portion inward, so that the engaging surface moves radially inward to frictionally engage the shaft.

11. The electrical submersible pump assembly according to claim 10, wherein the inner surface of the outer nut has a threaded portion that engages a threaded portion of the outer surface of the inner collet.

12. The electrical submersible pump assembly according to claim 10, further comprising:
- an axial alignment groove on an outer surface of the shaft;
- a shoulder portion of the inner collet that extends axially past the outer nut;
- a radially extending orifice in the shoulder portion of inner collet, the orifice extending from the inner diameter of the collet to the outer surface of the collet; and
- a radially extending alignment pin positioned within the orifice, a portion of the alignment pin engaging the alignment groove to prevent rotation of the inner collet relative to the shaft.

13. The electrical submersible pump assembly according to claim 10, wherein:
- the inner surface of the outer nut has a threaded portion that engages a threaded portion of the outer surface of the inner collet; and
- the outer nut has drive flats on an exterior of the outer nut for engagement by a tool to rotate the outer nut and move the outer nut from the first position to the second position.

14. The electrical submersible pump assembly according to claim 10, wherein each of the outer nut, the inner collet, and the shaft are not permanently deformed when the outer nut is moved from the first position to the second position.

15. The electrical submersible pump assembly according to claim 10, wherein the shaft further comprises an axially extending alignment groove and wherein the inner collet further comprises a radially extending orifice extending from the outer surface of the collet to the inner diameter of the collet, and an alignment pin positioned within the orifice; a portion of the alignment pin engaging the alignment groove to prevent rotation of the inner collet relative to the shaft.

16. An electrical submersible pump assembly comprising:
- a plurality of modules secured together, one of the modules comprising a motor and another of the modules comprising a pump that is driven by the motor;
- at least one of the modules comprising:
- a housing with a longitudinal axis;
- a rotatably driven shaft axially located within the housing, the shaft having an axial alignment groove on an outer surface of the shaft;
- upper and lower support bearings in the housing that radially support the shaft;
- an upper shaft-locating device, rigidly mounted around the shaft and located in abutment with an upper side of one of the support bearings, preventing downward movement of the shaft in the housing;
- a lower shaft-locating device, rigidly mounted on the shaft and located in abutment with a lower side of one of the support bearings, preventing upward movement of the shaft in the housing; each of the shaft-locating devices comprising:
- a cylindrical inner collet having an inner engaging surface that fits around the shaft, an outward-tapered portion on an outer surface of the inner collet, a plurality of axial slots, and a threaded portion on the outer surface;
- a radially extending orifice extending from an outer surface of the inner collet to the alignment groove on the shaft;
- a radially extending alignment pin positioned within the orifice, a portion of the alignment pin engaging the alignment groove to prevent rotation of the inner collet relative to the shaft;
- an outer nut, concentrically located around the inner collet, the outer nut having an inward facing tapered portion on an inner surface, at least a portion of the inward-facing tapered portion having an inner diameter that is smaller than at least a portion of an outer diameter of the outward-facing tapered portion, the outer nut having an inner threaded portion that engages the outer threaded portion of the collet; and wherein
- rotation of the outer nut relative to the inner collet causes the inward-facing tapered portion of the outer nut to urge the outward-facing tapered portion of the collet inward, so that the engaging surface moves radially inward to frictionally engage the shaft.

17. The assembly according to claim 16, wherein:
- the inner collet has a shoulder portion that extends axially past the outer nut and abuts one of the sides of one of the support bearings; and
- the orifice extends through the shoulder portion.

* * * * *

UNITED STATES PATENT AND TRADEMARK OFFICE
CERTIFICATE OF CORRECTION

PATENT NO. : 9,080,437 B2  
APPLICATION NO. : 13/621988  
DATED : July 14, 2015  
INVENTOR(S) : Christopher M. Brunner et al.

It is certified that error appears in the above-identified patent and that said Letters Patent is hereby corrected as shown below:

In the Specification
Column 1, line 31, delete "grove" and insert -- groove --
Column 4, line 4, delete "shall" and insert -- shaft --
In the Claims
Column 5, line 51, insert a -- , -- after "devices" and before "one"
Column 7, line 35, insert -- the -- between "of" and "inner"

Signed and Sealed this
Twenty-first Day of June, 2016

Michelle K. Lee
*Director of the United States Patent and Trademark Office*